United States Patent [19]

Angus

[11] 4,052,597
[45] Oct. 4, 1977

[54] CONSTANT TORQUE MULTIPLE DRUM COUNTER

[75] Inventor: James W. Angus, Nashua, N.H.

[73] Assignee: Sun Chemical Corporation, New York, N.Y.

[21] Appl. No.: 704,044

[22] Filed: July 9, 1976

[51] Int. Cl.² .................... G06M 1/18; G01L 7/12
[52] U.S. Cl. .................... 235/92 C; 235/92 EA; 235/92 R; 235/133 A; 73/386
[58] Field of Search ............ 235/92 C, 92 V, 92 EA, 235/133 A, 137; 73/384, 386

[56] References Cited

U.S. PATENT DOCUMENTS

| | | | |
|---|---|---|---|
| 2,973,145 | 2/1961 | Daniels et al. | 235/133 A |
| 3,047,225 | 7/1962 | Grafstein | 235/133 A |
| 3,154,948 | 11/1964 | Andresen | 73/386 |
| 3,548,166 | 12/1970 | Sebastian | 235/92 C |
| 3,619,587 | 11/1971 | Chambers | 235/92 C |
| 3,778,600 | 12/1973 | Burton | 235/92 C |
| 3,875,376 | 4/1975 | Kakeno | 235/92 C |
| 3,916,185 | 10/1975 | Jehly | 73/386 |

*Primary Examiner*—Joseph M. Thesz
*Attorney, Agent, or Firm*—Cynthia Berlow

[57] ABSTRACT

An auxiliary force-applying mechanism is connected to a counter type altimeter for applying a supplemental force to rotate its counter mechanism at the time a Geneva type mechanism advances a second drum by one indicator position. The force applied to the drum mechanism is approximately equal to the additional force required to advance the second drum through the Geneva mechanism so that a relatively constant load is applied to the altimeter driving mechanism such as an aneroid capsule. In a second embodiment, a constant auxiliary force is applied to the altimeter drum and this relatively constant auxiliary force is relieved during the time that the Geneva mechanism advances a second drum by one drum position so that a relatively constant force is applied to the aneroid capsule. An electronic circuit is provided for actuating the auxiliary force-applying mechanism and contains photosensing circuit means which actuates at the time that the Geneva mechanism becomes operative for moving a second drum, and the photosensing elements are arranged relative to slots in a drum rim.

8 Claims, 13 Drawing Figures

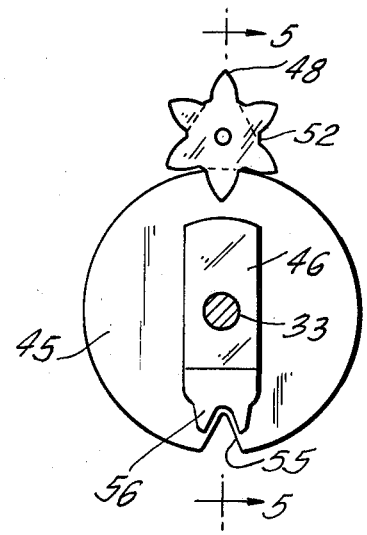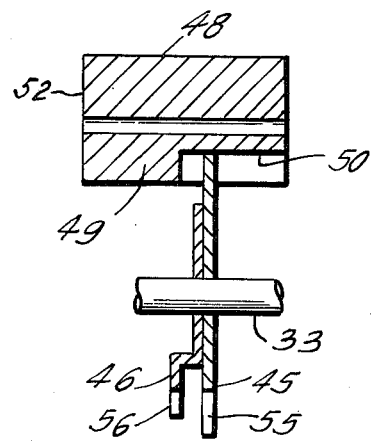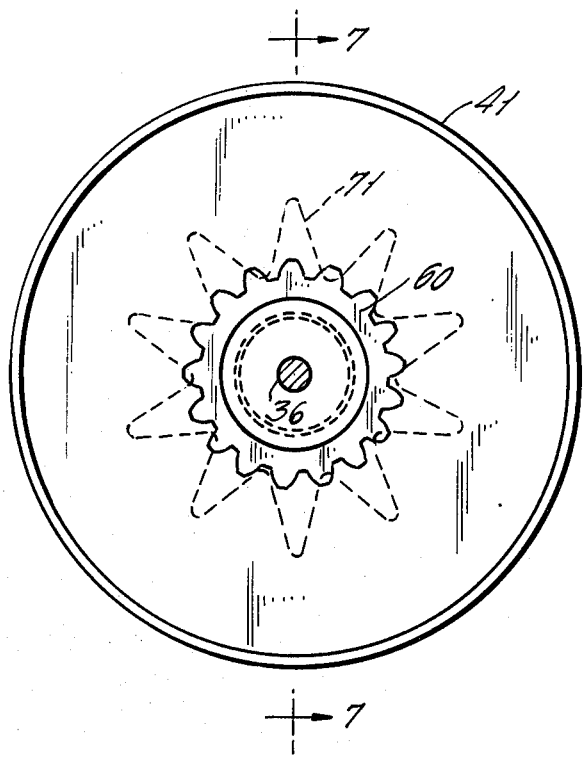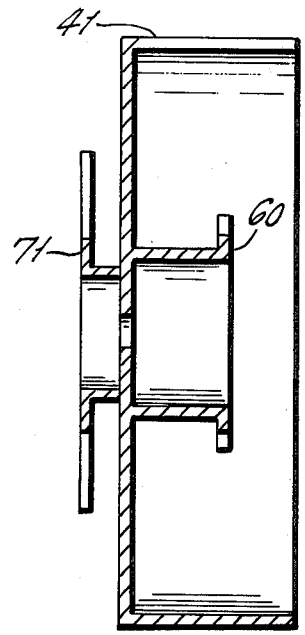

CONSTANT TORQUE MULTIPLE DRUM COUNTER

BACKGROUND OF THE INVENTION

This invention relates to counter type precision aircraft altimeters, and more specifically relates to a novel mechanism for modifying the load dynamics of a counter type altimeter so that a constant load is applied to the aneroid capsule which drives the altimeter.

In a conventional precision altimeter, a pair of evacuated capsules are arranged in parallel with one another and equally drive a common shaft system. A suitable mechanism is provided to change the straight line capsule motion to a rotary shaft motion so that the pressure altitude is linearly related to the rotation of the shaft system. The rotation of the first shaft which is connected to the capsules is usually limited to about 50° of travel for the full range of the altimeter (such as 80,000 feet). The altimeter will then have a pointer which rotates 360° for each 1,000 feet of altitude so that the gear ratio for the mechanism is approximately 550 to 1.

An altitude counter is also conventionally provided which generally consists of a three-drum device where the first drum is directly geared to the pointer shaft. Intermittent gears and holding disks, sometimes referred to as Geneva gears, then connect this first drum to the second drum, and connect the second drum to the third drum, in such a manner that, when the drum connected to the pointer moves from 0 to 9, the second and third drums are locked, but when the first drum moves from 9 to 0, the second drum rotates with the first drum for a distance of one digit (36° in this example). Thus, if the first drum is the 100 foot drum, then both the 100 foot and 1,000 foot drum will rotate together for this one digit. Finally, after the first drum has made nine revolutions and the second 9/10ths of a revolution, and as the first drum makes its 10th pass from 9 to 0, the third drum (the 10,000 foot drum) will be picked up with the second drum and all three drums will roll one digit (or 36°) together.

It will be understood that, as the second and third drums are transferred to a new digit position (either moved ahead or back), an additional load is applied to the aneroid capsules which drive the entire mechanism through the very high gear ratio of 550 to 1 in this example. Thus, an offset effect is applied to the capsules which is seen as a slowdown or even a stopping action of the pointer followed by a quickening motion or jump as the capsule accepts the added load. After the extra load of the drum or drums has been removed when the drum or drums have reached their new position, the pointer position may overshoot and come to rest momentarily and then proceed in step with the driving mechanism.

BRIEF DESCRIPTION OF THE INVENTION

In accordance with the present invention, the load dynamics of the system are modified so that the driving spring (aneroid capsule) sees a more constant load. In accordance with a first embodiment of the invention, a novel "boost" mechanism is provided in which an additional force is applied to the second drum during the time that the second drum transfers to a new digit position. This will then assist the capsules in accelerating the drum assembly during the transfer time and will reduce the overshoot when the Geneva mechanism releases the drums because the spring capsules will not be additionally loaded during the time they drive the drum mechanism.

The novel boost mechanism may consist of a solenoid operated pawl which engages a cooperating toothed member on the second drum assembly. The movement of the pawl into the toothed wheel is then arranged to drive the toothed wheel, and thus the second drum, with a camming force for some portion of the width of the tooth which is engaged. Alternatively, an electromagnetic system can be provided in which spaced high permeability tooth type members carried by the second drum assembly are attracted by suitably mounted electromagnets. The timing of the actuation of the auxiliary force-applying mechanism may be determined by a set of photodetectors aligned with respective light sources on opposite sides of the 100 foot drum. Small holes in the rim of the 100 foot drum allow light from the light sources to fall on their respective photodetector when the drum reaches predetermined angular positions. The photodetector outputs are connected to a suitable logic system which determines the point at which the auxiliary force should be applied to the drum.

In a second embodiment of the invention, a relatively constant force or torque load which is approximately equal to the force required to transfer the second drum to its next position is added to the driving mechanism, with this constant force being relieved at the time of drum transfer. Thus, a most constant force is applied to the spring capsule system over its full range of deflection.

BRIEF DESCRIPTION OF THE DRAWINGS

FIG. 4 is a plan view which illustrates the holding disk and driving fork of the Geneva type driving mechanism of the arrangement of FIG. 2.

FIG. 5 is a cross-sectional view of FIG. 4 taken across the section line 5—5 in FIG. 4.

FIG. 6 is a front plan view of the first and second drums of FIG. 2 when seen from its open end.

FIG. 7 is a cross-sectional view of the drum of FIG. 6 when taken across the section line 7—7 in FIG. 6.

DETAILED DESCRIPTION OF THE DRAWINGS

Figure 1:
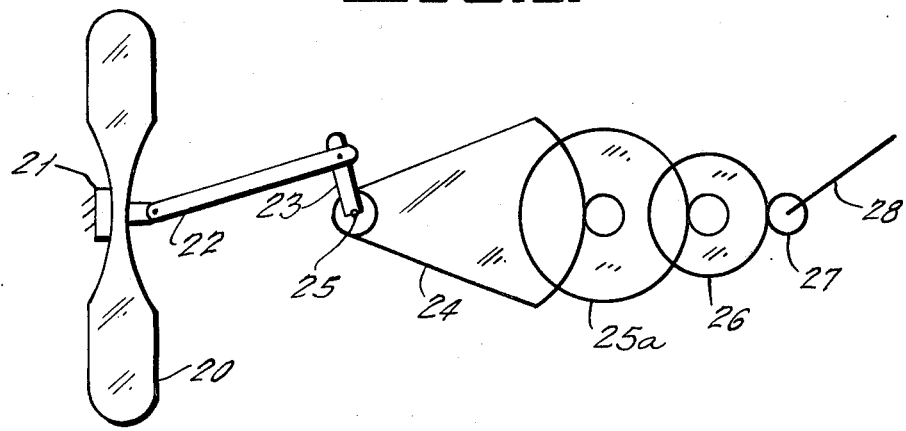
FIG. 1 schematically illustrates the linkage extending from an aneroid capsule to an altimeter pointer.

Referring first to FIG. 1, there is illustrated in schematic fashion, a typical aneroid capsule 20 which is an evacuated capsule which has a fixed mounting region 21 and which has a pivotally mounted output line 22 connected thereto. The capsule will expand and contract with pressure changes exerted on the capsule exterior thereby causing link 22 to move. Link 22 is then pivotally connected to an arm 23 which is operable to rotate a sector gear 24 which is mounted on a fixed pivot region 25. The sector gear 24 then engages gear 25a of a gear train which also includes gear 26 and gear 27. The ratio of the gear train constituted by gears 24 to 27 can be, for example, 550 to 1. The final gear 27 is then connected to a rotatable pointer 28 which sweeps over a stationary scale (not shown) with the pointer 28, for example, making one revolution for each 1,000 foot change in altitude as measured by capsule 20.

Figure 2:
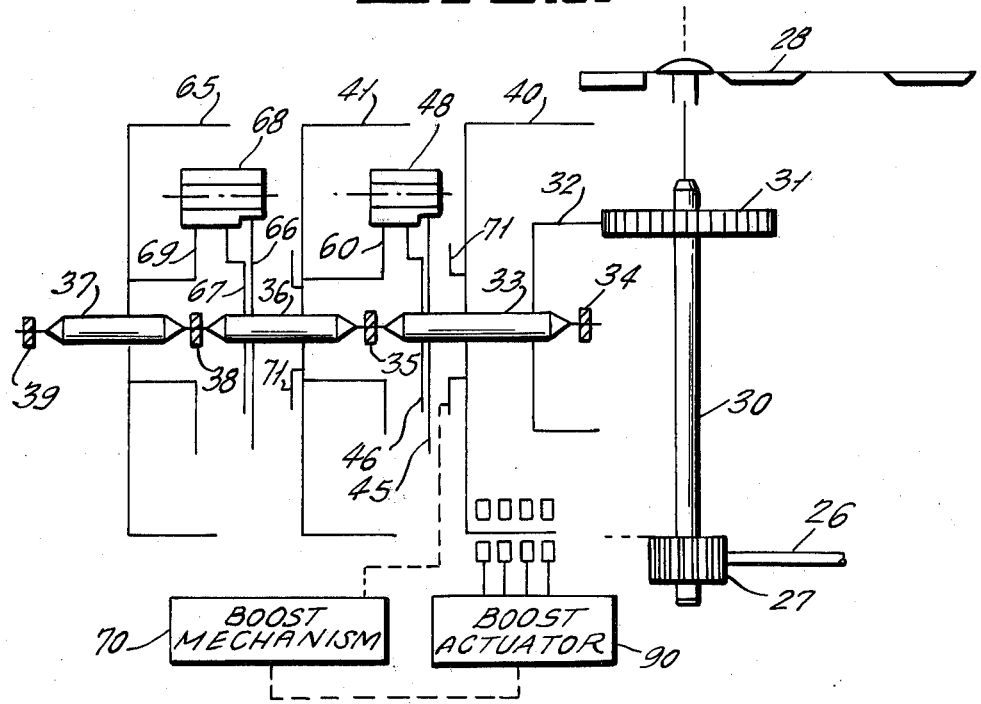
FIG. 2 schematically illustrates the present invention in connection with three drum type altimeters, and schematically illustrates the placement of a boost mechanism.

The pointer mechanism and the altitude counter drums are shown in FIG. 2 wherein FIG. 2 shows the pointer 28 mounted on a handstaff assembly 30 which is in turn suitably pivotally mounted. The handstaff assembly 30 includes the gear 27 of FIG. 1 which is shown schematically as being engaged by the larger gear 26 of FIG. 1. A spur gear 31 is also mounted on the shaft 30 of the handstaff assembly and drives a crown gear 32 about an axis, with the crown gear 32 driving a shaft 33 which rotates about its axis.

Figure 3:
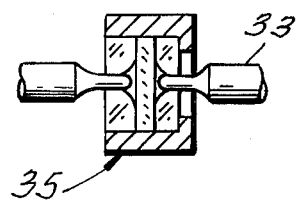
FIG. 3 illustrates a detail of the jewel bearing support for the various drums.
Figure 8:
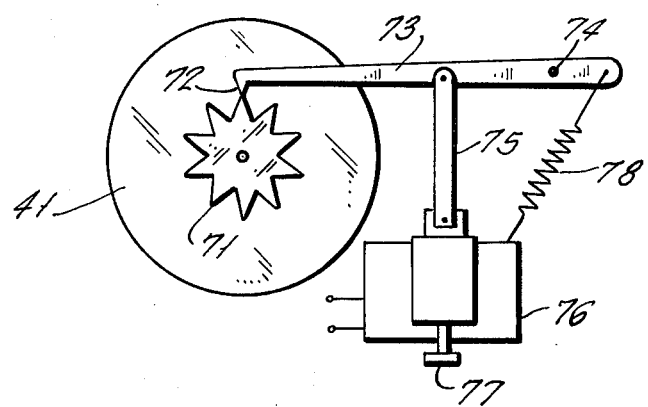
FIG. 8 schematically illustrates the novel power boost mechanism for the counter drum of FIGS. 2, 6 and 7.

The shaft 33 is pivotally mounted between jewel bearings 34 and 35 where the jewel bearing 35 is shown in detail in FIG. 3 to illustrate the typical low friction mounting of the shaft 33 as well as other shafts. It will be noted that the drum assembly also includes shafts 36 and 37 which are generally pivotally supported in the bearing assemblies 38 and 39 which are substantially identical to the construction of bearing 35.

Shaft 33 then has the so-called 100 foot drum 40 secured thereto wherein the 100 foot drum 40 rotates with the same angular motion as the 100 foot pointer 28. Thus, the pointer 28 and the 100 foot drum 40 will indicate a 1,000 foot change in altitude for 360° of rotation. The 100 foot drum 40 may uncover 100 foot reading numerals if desired as it rotates.

The shaft 33 is then connected to a Geneva drive type mechanism for rotating the 1,000 foot drum 41 through 36° of rotation for the last 36° of rotation of the drum 40. Thus, as the 100 foot drum 40 goes from 900 to 0, the 1,000 foot drum 41 will rotate by one digit therewith to change the 1,000 foot reading.

The Geneva type drive mechanism connecting drums 40 and 41 includes a holding disk 45 (FIGS. 2, 4 and 5) and a driving fork 46 which is connected to and rotates with the holding disk 45. The Geneva pinion 48 is mounted to engage the holding disk 45 and driving fork 46 in the conventional manner where the sides of two of the teeth of Geneva pinion 48 engage the disk.

The holding disk 45 has a notch section 55 which allows it to clear the full gear teeth of the triangular section formed by surfaces 50, 51 and 52 while driving fork 46 has a gear tooth segment 56 which meshes with gears 49 of the Geneva pinion 48 during the time that the drum 41 rotates from 900 to 0. Consequently, the entire Geneva pinion 48 will rotate one increment for this 36° segment of rotation of the 100 foot drum 40. For a three lobed pinion, this is 120°.

The Geneva pinion 48 then drives the drum drive gear 60 which is secured to the 1,000 foot drum 41 as shown in FIGS. 2, 6 and 7. The gear ratio between the driving fork 46 and the drive drum gear 60 is 1 to 1 whereby the 1,000 foot drum 41 rotates for 36° as the 100 foot drum 40 moves from 900 to 0 in the usual prior art manner. As pointed out previously, this Geneva type drive mechanism will place an added load on the capusle 20 of FIG. 1 during the time that the altitude drum 41 is transferred from one position to another.

The altitude counter may then have additional drums, such as the 10,000 foot drum 65. The 10,000 foot drum 65 is shown in FIG. 2 and is fixed to and rotates with shaft 37. The 10,000 foot drum 65 is driven from the 1,000 foot drum 41 through a second Geneva type mechanism which includes a holding disk 66, driving fork 67, Geneva pinion 68, drive drum gear 69, where these components are identical to the components 45, 46, 48 and 60, respectively. Consequently, whenthe 1,000 foot drum 41 moves from 9,000 feet to 0, the 10,000 foot drum 65 will rotate therewith to provide a new 10,000 foot indication.

In accordance with a first embodiment of this invention, and as shown in FIGS. 1, 6, 7 and 8, a novel power boost arrangement is provided for adding an auxiliary force into the drum driving mechanism during the time that the 1,000 foot drum 41 rotates with the 100 foot drum 40. This auxiliary forcethen supplements the force supplied from the capsule 20 of FIG. 1 and ensures a more constant loading on the system, thus precluding stopping and jumping of the pointer 28 in its rotation when the altimeter is additionally loaded by the movement of the 1,000 foot drum 41.

The auxiliary power boost mechanism is schematically illustrated in FIG. 2 as the power boost mechanism 70 which is connected to a toothed wheel 71 which is fixed coaxially with drum 41. In the embodiment illustrated, the wheel 71 is a ten-toothed wheel where the teeth are shaped to receive a conforming pawl 72 formed on the end of a pawl actuator link 73. The pawl actuator link 73 is pivotally mounted at pivot 74 and is pivotally connected to the plunger 75 of a solenoid actuator 76. The plunger 75 may have an enlarged head 77 to enable control of the stop position for the plunger 75 in both of its directions of movement. A pawl-return spring 78 is connected between the solenoid body and the arm 73 as shown to ensure a return of the arm 73 to a tooth-released position after the wheel has been advanced as desired. With the above structure, once it is necessary to rotate drum 41, the drum rotation will be assisted by energizing the solenoid 76, thereby to move the solenoid plunger 75 downwardly, causing the pawl member 72 to engage a suitably aligned tooth of the toothed wheel 71, thereby camming the toothed wheel 71 in the desired direction.

Figure 9A:
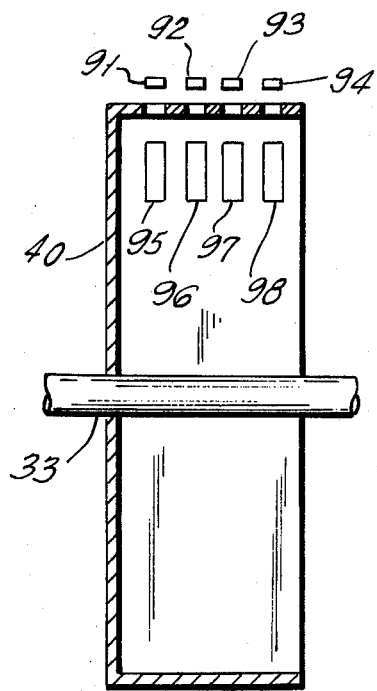
FIG. 9a is a cross-sectional view of the 100 foot drum of FIG. 1 and schematically illustrates the photosensing circuit elements which are positioned relative to the 100 foot drum.

In order to energize the solenoid 76 at the proper time, a novel boost actuator circuit 90 is provided which monitors the position of the 100 foot drum 40 in order to determine when the power boost mechanism should come into play. The novel power boost actuator 90 will be described more fully hereinafter in connection with FIG. 10 and is operated in response to signals received by light-sensing devices, such as phototransistors 91, 92, 93 and 94 which are aligned with appropriate light sources 95 to 98, respectively (which may be light emitting diodes or the like) and which are stationarily mounted on opposite sides of the rim of 100 foot drum 40 as best shown in FIGS. 2 and 9a. Note that transistors 91 to 94 may be appropriately arranged with other transistors in Darlington type arrangements.

Figure 9B:
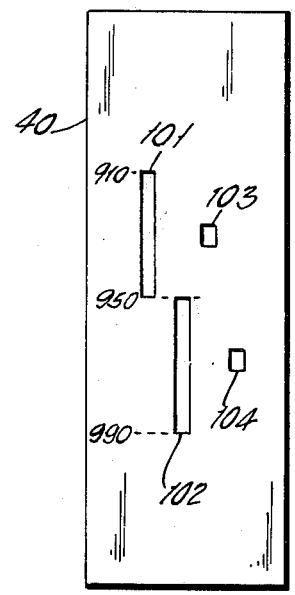
FIG. 9b is a top plan view of the drum of FIG. 9a and illustrates the arrangement of the light-passing slots in the rim of the 100 foot drum.

The 100 foot drum 40 then has four slits in its rim including slits 101 to 104 which correspond to the axial position of phototransistors 91 to 94 and light sources 96 to 98, respectively. The slits 101 and 102 have lengths corresponding to a 14° segment around the rim of drum 40 and as shown in FIG. 9b correspond to rotation of the drum between the 910 foot and 990 foot and 950 foot positions. Thus, both slits 101 and 102 have a length corresponding to 40 feet in altitude as indicated by the drum 40. Slits 103 and 104 have a shorter length and each corresponds to approximately 10 feet in altitude and occupy 3.6° of the drum rim.

Figure 10:
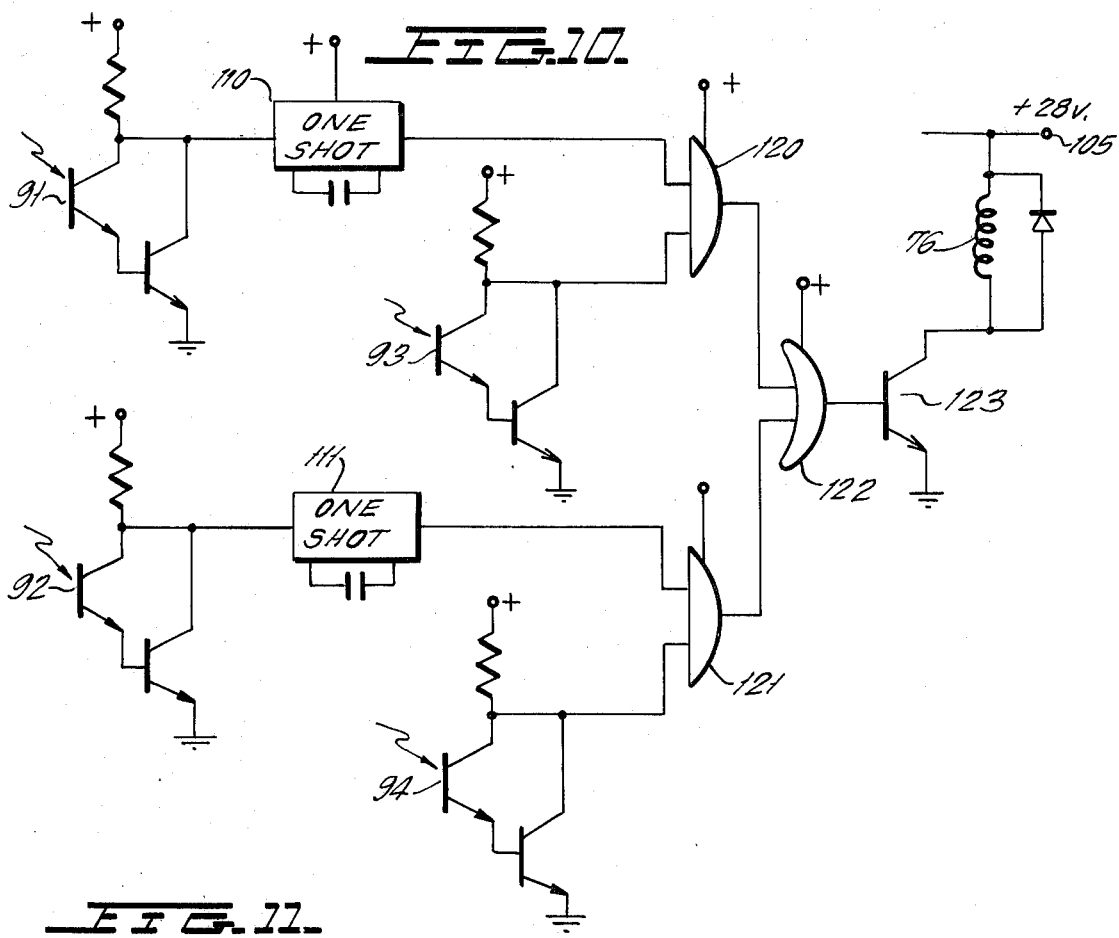
FIG. 10 is a circuit diagram which shows the logic arrangement and control circuit for operating the solenoid actuated power boost mechanism of FIG. 8.

FIG. 10 schematically illustrates the novel boost actuator circuit and schematically illustrates the solenoid winding 76 which is to be actuated from a suitable power source such as a 28 volt source which is connected between the positive terminal 105 and ground.

In the circuit of FIG. 10, the phototransistors 91 and 93 are used for the increasing altitude function, while the phototransistors 92 and 94 are used for a decreasing altitude function. Each of the phototransistors 91 and 92 are arming transistors which are actuated when the 100 foot drum 40 reaches the 900 foot mark for an increasing operation, or the 0 foot mark for a decreasing operation. If the drum continues to move for 10 feet or 3.6°, then the trigger phototransistor 93 or 94 is actuated since corresponding slits 103 and 104, respectively, expose the transistor 93 or 94, respectively, to light sources 97 or 98, respectively.

The circuit for each of arm transistors 91 and 92 include one-shot multivibrators 110 and 111, respectively, which are designed to provide a signal for a predetermined time, for example, 0.1 seconds after they receive an input signal.

The output of the trigger transistors 93 and 94 will be on for 40 feet of altitude change of the drum 40. The outputs of transistors 91 and 93 are connected to AND circuit 120 and, similarly, the output of transistors 92 and 94 are connected to AND circuit 121. Thus, the output of the one-shot 111 and photoconductor 94 must be on simultaneously during the 0.1 second interval of the respective one-shot elements 110 and 111 to produce an output through gates 120 and 121, respectively, the outputs of gates 120 and 121 are then connected to OR gate 122 and the output of OR gate 122 is connected to the base of a power transistor 123. Transistor 123 becomes conductive responsive to an output signal from gate 122 and permits current flow through the solenoid coil 76, thereby to enable actuation of the solenoid 76 and the actuation of pawl 72 to advance the ten-toothed wheel 71 and thus the 1,000 foot drum 41.

Figure 11:
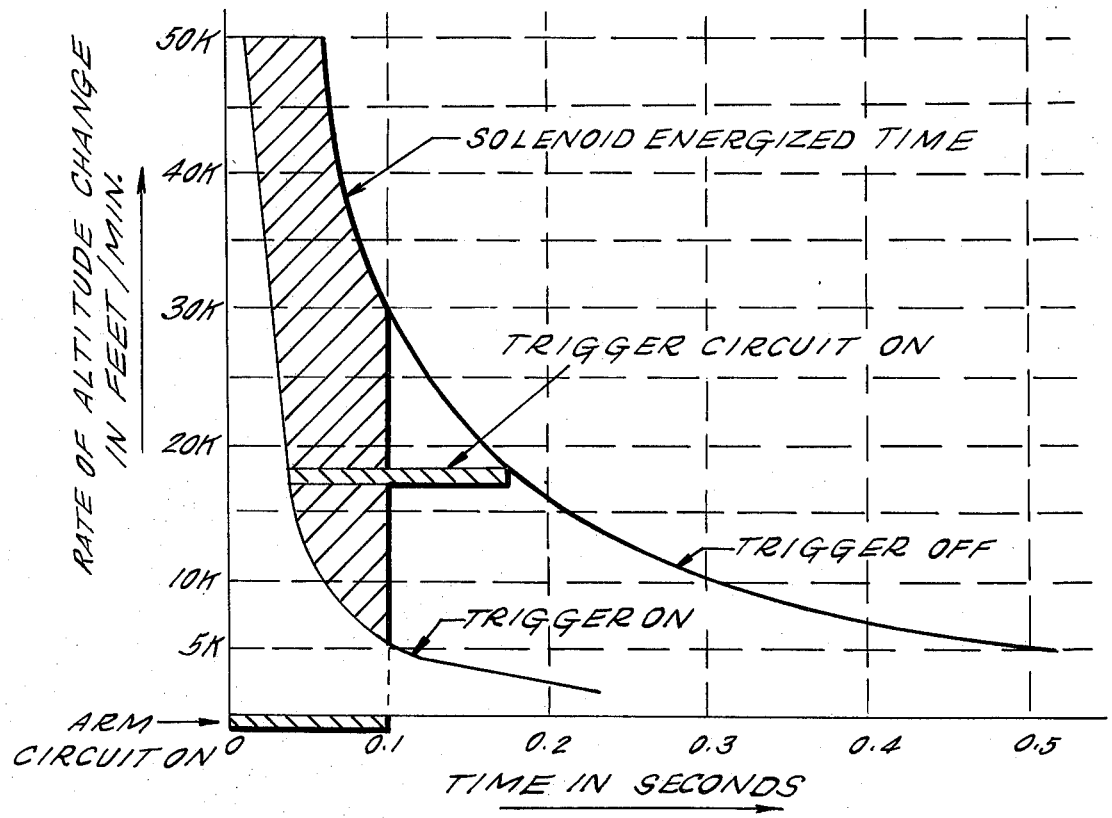
FIG. 11 is a graph which schematically illustrates the operation of the circuit of FIG. 10 for different rates of altitude change.

The operation of the novel solenoid actuating circuit is further illustrated in FIG. 11 to indicate the manner in which the circuit operation changes with different rates of altitude change. The shaded zone in FIG. 11 represents the overlap period during which the solenoid coil 76 is energized. Note that the solenoid will not come into operation at a rate of change of altitude below 6,000 feet per minute. This is because the drum 40 of FIGS. 2 and 9b will not have advanced 3.6° (10 feet in altitude change) during the 0.1 seconds that the one-shot 110 or 111 was on. Thus, the gate 120 (or 121) received only one signal and no input signal was applied to transistor 123.

The chart of FIG. 11 further indicates that for rates above 30,000 feet per minute, the time at which the solenoid is energized is controlled primarily by the trigger portions of the ciructs including the one-shot 111 and photoconductor 94, while between 6,000 and 30,000 feet per minute the turn on the solenoids is controlled by the trigger units 93 and 94 while the turn off of the solenoids is controlled by the arm unit portions of the circuit including transistors 91 and 92 and their respective one-shot elements 110 and 111.

Figure 12:
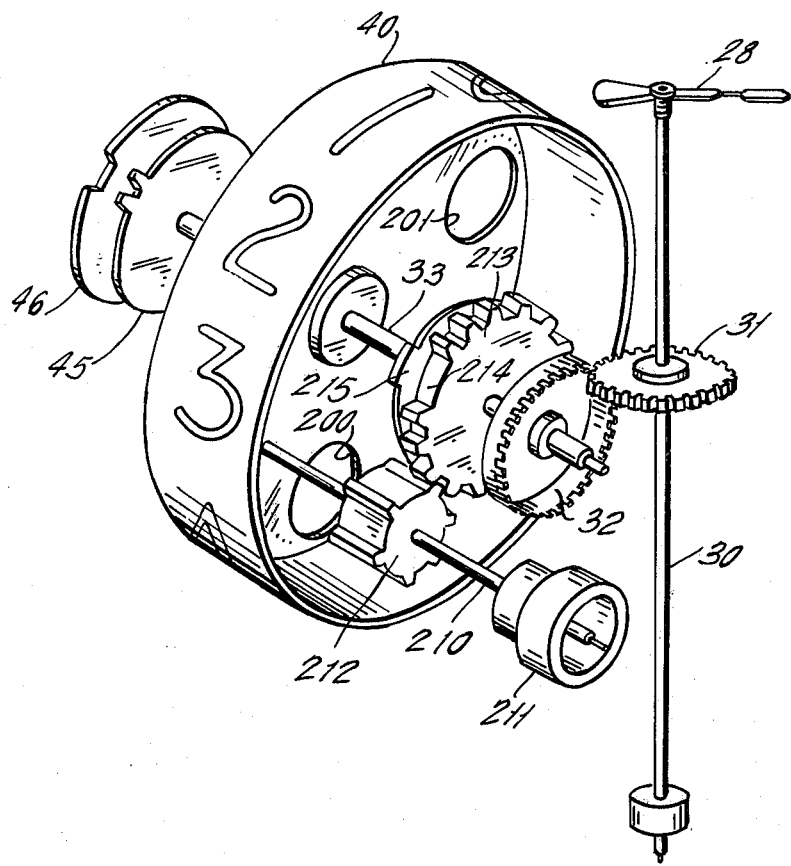
FIG. 12 is a perspective drawing of a second embodiment of the invention wherein a relatively constant torque load, which is approximately equal to the torque required to transfer the second drum to its next position, is added to the driving mechanism and is relieved at the time of drum transfer.

Referring next to FIG. 12, there is shown therein a second embodiment of the invention in perspective view. In FIG. 12, components which are identical to those of FIG. 2 have been given similar identifying numerals. It should be noted that in FIG. 12 the drum 40 is provided with cutouts 200 and 201 to reduce its mass.

The embodiment of FIG. 12 differs from that of FIG. 2 in that a rotatable shaft 210 is added which is fixed in the position shown relative to shaft 33. Shaft 210 carries an auxiliary mass 211 which is fixed thereto and rotatable therewith and also has a Geneva-type pinion 212 fixed thereto and rotatable therewith. The shaft 33 is further provided with a tooth wheel 213 which, for example, may have twenty teeth with two teeth removed at location 214, and has a Geveva holding element 215 which cooperates with the Geneva pinion 212.

In operation, the configuration of FIG. 12 is such that the inertia of auxiliary mass 211 ordinarily adds an additional, relatively constant torque to the drive mechanism connected to pointer shaft 30. This additional torque is selected to be equal to the torque required to transfer the next drum driven by the Geneva drive elements 45 and 46 (drum 41 in FIG. 2) by one position. During this transfer time and in accordance with the arrangement of FIG. 12, the 20 tooth wheel 213 is rotated to a position such that the Geneva pinion 212 is in the peripheral position of 20 tooth wheel 213 that has two teeth removed therefrom. Consequently, there is no driving connection between the wheel 213 and the pinion 212 during transfer of drum 41 so that the additional torque normally presented by the mass 211 is not presented to the pointer shaft. However, during this interval, the additional torque imposed by the transfer of drum 41 is applied to the operating mechanism so that the operating mechanism provides a constant torque throughout the operating of drums 40 and 41.

Although the present invention has been described in connection with a preferred embodiment thereof, many variations and modifications will now become apparent to those skilled in the art. It is preferred, therefore, that the present invention be limited not by the specific disclosure herein, but only by the appended claims.

The embodiments of the invention in which an exclusive privilege or property is claimed are defined as follows:

1. An indicating instrument comprising, in combination:

aneroid capsule transducer means for converting a measured parameter into rotational motion:

a shaft connected to said transducer means and rotated thereby;

a first rotatable counter drum connected to said shaft; said first counter drum moving at the same angular rate as said shaft and indicating the measure of said measured parameter within a first given portion of the total range of said measured parameter;

a second counter drum for indicating multiples of said first given portion of the total range of said measured parameter and drive coupling means connecting said first and second drums, whereby said first and second drums rotate together for only a relatively short portion of the total rotation of said first drum;

and auxiliary force applying means connected to said second drum for modifying the force applied thereto from said shaft during the time said second drum rotates with said first drum so that the force on said shaft during the rotation of said first and second drums is substantially the same as the force on said shaft when said first drum is rotating alone.

2. The indicating instrument of claim 1 which further includes actuation means for actuating said auxiliary force applying means; said actuation means including first drum position monitoring means connected to said first drum which is responsive to actuate said auxiliary force applying means to cause the application of an added rotational force to said second drum when said first drum reaches the position at which said second drum is to rotate therewith.

3. The indicating instrument of claim 2 wherein said instrument is an altimeter and wherein said first given portion of said total range is 1,000 feet in altitude, and wherein said second drum indicates altitudes from 1,000 feet to 10,000 feet, and wherein said first and second drums rotate with one another for about 36°.

4. The indicating of claim 2 wherein said auxiliary force applying means includes electromagnetic means fixed to said second drum; said actuation means connected to said electromagnetic means and producing an output when said first drum moves to the position where said second drum is to move therewith at some given range of rate of altitude change.

5. The indicating instrument of claim 2 wherein said auxiliary force applying means includes a solenoid and a ferromagnetic member fixed to said second drum and moved by said solenoid; said actuation means connected to said solenoid and producing an output when said first drum moves to the position where said second drum is to move therewith at some given range of rate of altitude change.

6. The indicating instrument of claim 1 which further includes a pointer secured to said shaft, and an indicating dial fixed relative to said pointer and cooperating with said pointer to provide an indication of said measured parameter over a first given portion of the total range of said measured parameter.

7. The indicating instrument of claim 6 wherein said drive coupling means includes a Geneva type drive mechanism.

8. The indicating instrument of claim 6 which further includes actuation means for actuating said auxiliary force applying means; said actuation means including first drum position monitoring means connected to said first drum which is responsive to actuate said auxiliary force applying means to cause the application of an added rotational force to said second drum when said first drum reaches the position at which said second drum is to rotate therewith.

* * * * *